Figure 1:
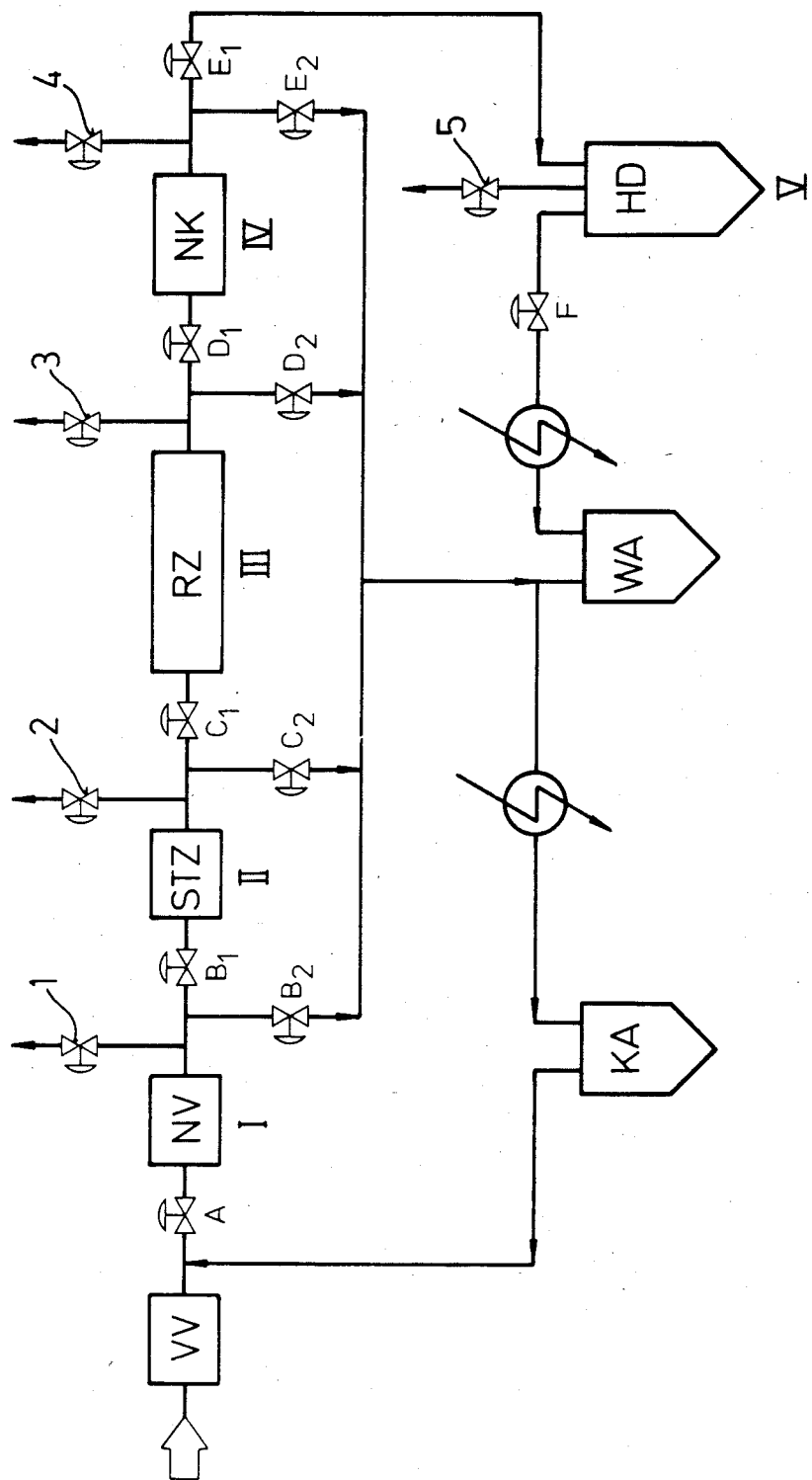

United States Patent [19]

Kanne et al.

[11] Patent Number: 4,804,725

[45] Date of Patent: Feb. 14, 1989

[54] REDUCTION OF THE EMISSION OF HYDROCARBONS IN PRESSURE-REDUCTION PROCESSES IN HIGH PRESSURE POLYMERIZATION REACTORS

[75] Inventors: Friedrich Kanne, Wesseling; Franz G. Mietzner, Ludwigshafen; Klaus Pfleger, Wesseling; Siegfried Kursawe, Wesseling; Klaus Boettcher, Wesseling; Gerhard Arnold, Wesseling, all of Fed. Rep. of Germany

[73] Assignee: BASF Aktiengesellschaft, Ludwigshafen, Fed. Rep. of Germany

[21] Appl. No.: 127,988

[22] Filed: Dec. 3, 1987

[30] Foreign Application Priority Data

Dec. 4, 1986 [DE] Fed. Rep. of Germany ....... 3641513

[51] Int. Cl.$^4$ ............................ G05B 9/00; C08F 2/34
[52] U.S. Cl. ........................................ 526/68; 422/17; 422/131; 526/352; 526/352.2; 526/64
[58] Field of Search ....................... 526/68, 352, 352.2

[56] References Cited

U.S. PATENT DOCUMENTS

| | | | |
|---|---|---|---|
| 3,781,256 | 12/1973 | Sadee et al. ................ | 260/86.7 |
| 4,115,638 | 9/1978 | Becker et al. ................ | 526/61 |
| 4,153,774 | 5/1979 | Boettcher et al. ............ | 526/352.2 |
| 4,424,319 | 1/1984 | Durand et al. ............... | 526/88 |
| 4,627,962 | 12/1986 | Grasset et al. .............. | 526/352 |
| 4,690,800 | 9/1987 | Nardi et al. ................. | 526/71 |

FOREIGN PATENT DOCUMENTS 1393919 5/1975 United Kingdom .

*Primary Examiner*—Edward J. Smith
*Attorney, Agent, or Firm*—Keil & Weinkauf

[57] ABSTRACT

The pressure in a continuous high pressure polymerization system, in which ethylene, with or without comonomers, is polymerized under high pressures and temperatures and the unconverted amounts of gas are recycled through the high pressure recycle gas system into the polymerization system, is rapidly reduced to below the particular reaction pressure when predetermined limiting pressure and/or temperature values are exceeded or when other faults occur by opening one or more pressure-relief apparatuses mounted on the high pressure polymerization system and transferring the hot let-down reaction mixture from the polymerization system via one or more let-down lines through one or more separator systems into the atmosphere, by a process in which the high pressure polymerization system is divided into a plurality of isolated sections at the same time as the let-down process is triggered and only the section in which the let-down process is triggered is let down to the atmosphere. Preferably, the sections in which the let-down process is not triggered can be let down into the high pressure recycle gas system, if necessary through a product separator, in synchronization with triggering of the let-down to the atmosphere.

3 Claims, 2 Drawing Sheets

REDUCTION OF THE EMISSION OF HYDROCARBONS IN PRESSURE-REDUCTION PROCESSES IN HIGH PRESSURE POLYMERIZATION REACTORS

The present invention relates to a process for the rapid reduction of the pressure in continuous high pressure polymerization systems in which ethylene or a mixture of ethylene and compounds which are copolymerizable with ethylene is polymerized under from 500 to 5,000 bar and at from 150° to 400° C. and the unconverted amounts of gas are let down to 200–400 bar and then recycled through the high pressure recycled gas system into the polymerization system.

In this process, the pressure is reduced to below the particular reaction pressure if the pressure and/or temperature falls below a predetermined value or in the event of other faults, by opening one or more pressure-relief apparatuses mounted on the high pressure polymerization system and transferring the hot reaction mixture from the polymerization system via one or more let-down lines through one or more separating systems into the atmosphere.

In a process of this type, measures have to be taken to avoid the high pressures and/or temperatures in the high pressure polymerization system which occur during decomposition reactions and may lead to damage, for example to a tube reactor. For this purpose, the reaction system is immediately let down to a pressure which is well below the reaction pressure, while at the same time the initiator feed is stopped. As a result, the highly pressure-dependent polymerization reaction is slowed down. For safety reasons, hot reaction mixture consisting of ethylene, polyethylene and decomposition products liberated during decomposition or other emergency shutdowns must not be collected in closed containers. Instead, the reactor must be let down into the atmosphere. This results in emissions of hot mixtures of polyethylene, ethylene, carbon black and decomposition products. In addition to the resulting environmental pollution caused in particular by the solids, gas clouds of hydrocarbons, such as ethylene and methane, hydrogen and carbon black may form and may be capable of explosive ignition when mixed with air. The explosive ignition of such gas clouds constitutes a considerable danger for the plant and the immediate environment. It is therefore absolutely essential that they are avoided.

It is known that, in order to satisfy the safety requirements when letting down high pressure polymerization systems, the system is provided with apparatuses which essentially consist of a Venturi tube in the gas outflow and a reservoir with a fluid which is sprayed in to cool the gas at the time when the reactor is being let down (cf. British Patent No. 1,393,919). The fluid may be, for example, water.

British Patent No. 827,682 discloses a process for the high pressure polymerization of ethylene, in which the apparatus used contains an additional valve directly after the polymerization space, with the aid of which valve the resulting decomposition products can be removed directly via a let-down vessel in the event of overheating, without the continuous working up of the normal polymerization products having to be disturbed or interrupted. In this process, the solid waste products are collected separately, while no separate apparatus is provided for cooling and purifying the resulting gaseous decomposition products.

In another process for the preparation of ethylene polymers under high pressure and at high temperatures, when a certain pressure is exceeded the reaction material is not discharged via the normal discharge pipe via a safety valve operated at this pressure but is removed through an outflow pipe and the outflowing reactor material is mixed with water (cf. U.S. Pat. No. 3,781,256). For this purpose, a plurality of vessels filled completely or partially with water are mounted in a chamber connected to the let-down line, the said vessels being intended to break under the prevailing temperature and pressure conditions. The water-filled vessels are bags made of a thermoplastic. Thus, in this process water is mixed with the decomposition gases removed at the top, so that, by cooling the hot reaction mixture and the decomposition products, explosive ignition in the air can be substantially avoided.

Furthermore, U.S. Pat. No. 4,115,638 discloses a process in which each jet of hot let-down reaction mixture emerging from the let-down line is fed not below the water surface but at an angle of from 0° to 45° to the water surface, into a let-down vessel partly filled with water, and the jet must come into contact with or strike the water surface.

The literature also discloses a number of other processes in which the total content of the polymerization system is let down into the atmosphere, the danger of explosions during let-down of the reaction mixture into the open being prevented (cf. U.S. Pat. Nos. 4,339,412, 4,424,319 or 4,534,924).

A disadvantage of the known processes for the rapid reduction of the pressure in continuous high pressure polymerization systems is that a large amount of hydrocarbons, in particular ethylene, is emitted. In the automatic circuits which are usually employed in practice and are necessary for rapid removal of the reaction mixture during decomposition, the procedure adopted is that the entire reactor is let down into the open, i.e. the total reaction mixture under very high pressure, from the compressors to the end of the reactor or the high pressure product separator, is released into the atmosphere. Depending on the size of the reactor used, up to 4 tonnes of hydrocarbons, especially ethylene, are emitted during a let-down process, resulting in very serious environmental pollution.

It is an object of the present invention to provide a process which makes it possible to reduce the emission of hydrocarbons which occurs during let-down processes in tube reactors or autoclaves which are used for the polymerization of ethylene.

We have found that this object is achieved, according to the invention, by processes according to claims 1 to 3.

Figure 2:
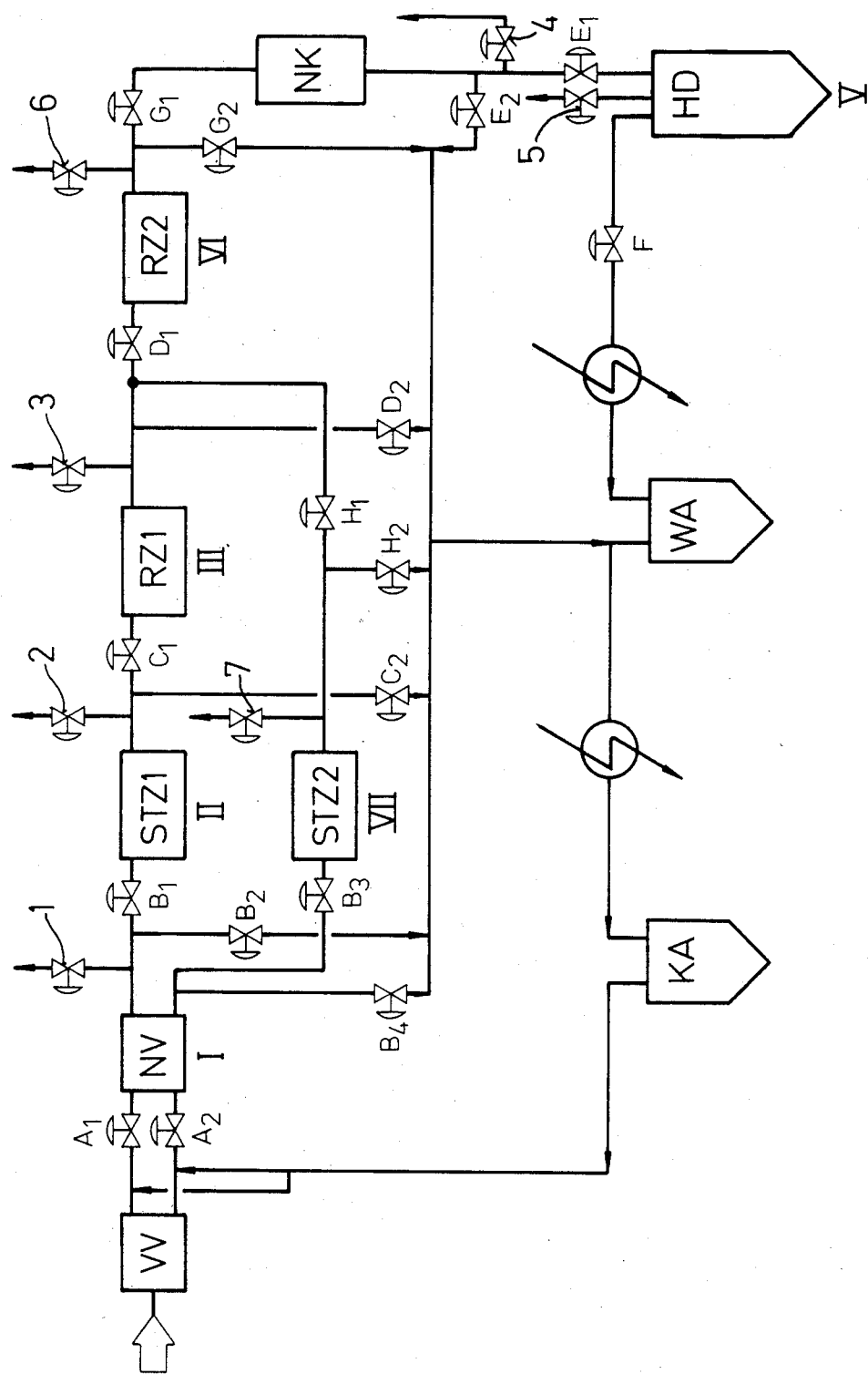

FIGS. 1 and 2 schematically illustrate the process of the invention.

A rapid reduction of the pressure is a pressure-relief process in which the pressure in the high pressure polymerization system (referred to as the reactor in industry) is reduced to not less than 50% of the original pressure in the course of about 30, preferably from 5 to 20, seconds after actuation of a pressure-relief apparatus. Rapid let-down to lower pressures is important for avoiding damage to the reactor.

The continuous high pressure polymerization systems in which ethylene or a mixture of ethylene and compounds which are copolymerizable with ethylene are polymerized under from 500 to 5,000 bar and at from 150° to 400° C., the unconverted amounts of gas being let down to 200–400 bar and then recycled through the high pressure recycled gas system into the polymerization system and the resulting ethylene polymers being deposited in the high pressure product separator, are disclosed in the relevant literature. Information about processes in which tube reactors or autoclaves are used can be found, for example, in Ullmanns Encyklopädie der technischen Chemie, 4th Edition, Volume 19, pp. 169–226.

The pressure in the polymerization system is reduced to below the particular reaction pressure but to not less than 50% of the original reaction pressure when predetermined limiting pressure and/or temperature values are exceeded or other problems arise. Predetermined limiting pressure and/or temperature values may be exceeded, for example, when, as a result of incorrect initiator injection or inadequate cooling of the reactor, the polymerization reaction changes into a decomposition reaction in which some of the reactor content is converted to carbon black and gaseous reaction products, such as methane and hydrogen. In order to achieve high ethylene conversion, the reaction conditions in the reactor are close to the critical point at which decomposition of ethylene occurs; hence, the supply of a small amount of heat due to deposits of polyethylene on the reactor wall, or insufficient mixing of the hot mixture present in the reactor, may cause the reaction conditions to reach this critical point locally, with the result that decomposition occurs. The resulting reactions are highly exothermal, so that there is a rapid increase in temperature and/or pressure in the reactor. In this case, the predetermined pressure and/or temperature limiting values are exceeded. Other problems may occur if the plant is endangered by a power failure or if, for example, a compressor fails, with the result that too little ethylene is fed in.

Opening of one or more pressure-relief apparatuses mounted on the reactor is effected by relevant conventional pressure-relief valves. Instead of pressure-relief valves which are opened via limiting pressure and/or temperature values, it is possible in principle also to use bursting disks or safety valves which automatically respond above certain limiting pressure values and result in partial emptying of the reactor. It is also possible to use controlled pressure-relief apparatuses in addition to automatically operating ones. However, controlled pressure-relief apparatuses are advantageously used.

The hot let-down reaction mixture is removed from the reactor via one or more let-down lines, all of which enter a let-down vessel. The let-down lines consist of pipes which are connected both to the reactor and to the separator system, so that any gas mixture flowing out of the reactor enters the separator system or the let-down vessel. The let-down vessel is designed as a separating pot in such a way that it withstands 10 bar or more. The let-down vessel is open at the upper end, so that the escaping gas or gas/product mixture is passed either directly into the atmosphere or through a second separating pot of similar design before it enters the atmosphere. In known processes, water may be sprayed into the stream of escaping gas (British Patent No. 1,393,919) or water may be introduced as a result of bursting of water-filled plastic vessels (U.S. Pat. No. 3,781,256) or the said gas may be directed toward the water surface (cf. U.S. Pat. No. 4,115,638).

In the process according to the invention, the high pressure polymerization system is divided up into a plurality of sections at the same time as the let-down process is triggered, and the only section let down to the atmosphere is that in which the let-down process has been triggered.

In a preferred process, the sections in which the let-down process has not been triggered are let down into the high pressure recycled gas system, this operation being synchronized with initiation of let-down to the atmosphere.

In a particularly preferred process, the reaction mixture is let down through a product separator into the high pressure recycled gas system.

Letting down of the reaction mixture from the reaction apparatuses (tube reactors or autoclaves) is triggered not only when decomposition occurs but also in other cases. For example, the reactor is also automatically shut down when control or monitoring apparatuses fail; according to the invention, in this case too the only section let down into the open is that in which the event has occurred.

In the novel process, a large number of temperature measuring points and several pressure measurements are distributed over the entire length of the reactor. If one of the upper limiting values for the pressure and temperature monitoring is reached, the emergency program is started. This is the case, for example, where decomposition occurs, or in the event of a faulty measurement or another technical defect; the two last-mentioned cases are referred to as malfunction trips.

The automatic circuits used in practice to implement the emergency program are commercial measuring and reguating systems (for example AEG Logistat control), by means of which a number of hydraulic valves are selected.

In the novel process, in the simplest case, the tube reactor has only one reaction zone; in practice, however, multizone reactors are also used. Much rarer is a combination of an autoclave and a tube reactor, which are connected in series. With these reactor types too (multizone reactors, autoclave in combination with tube reactors), the novel process according to the invention can be used.

The process described below for a single-zone reactor is illustrated schematically in FIG. 1.

The reactor can be divided up by bulkheads into five sections, this being done by means of hydraulic isolating valves when the emergency program is triggered. These sections are the following regions of the reactor:

| Section | Region between the valves |
| --- | --- |
| I Compressor (C) | A and $B_1$ |
| II Initiation zone (IZ) | $B_1$ and $C_1$ |
| III Reaction zone (RZ) | $C_1$ and $D_1$ |
| IV After-cooler (AC) | $D_1$ and $E_1$ |
| V High pressure separator (HP) | $E_1$ and F |

Each section of the reactor is equipped with a pressure-relief valve (1–5); the pressure-relief valves are connected via let-down lines to a separator system whose outlet pipe leads into the open. In a let-down process, the let-down reaction mixture from the reactor section in which the cause for the trip lay passes through the stated separator system before entering the atmosphere.

Where the cause of a trip is not located in the sections I, II, III and IV, these sections can be discharged via a discharge line to the high pressure recycled gas system, in brief the high pressure cycle or HP cycle (300 bar). For this purpose, the hydraulic valves $B_2$, $C_2$, $D_2$ and $E_2$ are opened and the reaction mixtures present in the corresponding sections of the reactor are fed into a discharge line. The discharge line enters a product separator (WA) which should have a minimum volume of 1 $m^3$. If vessels having a smaller volume are used, there is a danger that some of the polyethylene melt will be transported by the let-down gas/product mixture during the let-down process from the product separator (WA) into the adjacent coolers of the HP cycle; the cold melt is deposited in the coolers, resulting in blockage of the high pressure cycle (HP cycle). On the other hand, vessels having a volume greater than 1 $m^3$ can only have an advantageous effect in collecting the reaction mixture discharged from the sections of the reactor.

Section V, as part of the high pressure cycle, is not connected to the discharge line. If this section does not cause a let-down process to be triggered, the isolating valve $E_1$ closes while valve F remains open. If, on the other hand, the cause of the trip is in section V, this section is let down into the open by opening of the pressure-relief valve 5, isolating valves $E_1$ and F closing off the bulkheads.

It is possible in practice that, for example, a decomposition reaction begins at the boundary of a section and extends into the adjacent region. In this case, both sections are let-down into the open via the separator system with the aid of the automatic circuit (the remaining sections are discharged to the HP cycle).

Table 1 shows the let-down processes of the individual sections of the single-zone reactor and the particular positions and switching processes of the hydraulic valves.

The statements made with regard to the single-zone reactor apply in the general sense to an autoclave; the section designated as the initiating zone (IZ) in FIG. 1 is used as such when the autoclave is started up but is converted to the cooling zone during operation. The autoclave itself may be regarded as section II of FIG. 1.

The principle described for the single-zone reactor applies in the general sense to the multizone reactor; however, there are some additional sections. For each further reaction zone, the number of sections increases by two (reaction zone and associated initiating zone) or three where an additional compressor is used.

For the multizone reactors too, the individual sections are equipped with isolating valves to the bulkheads, with pressure-relief valves to the atmosphere and with pressure-relief valves to the high pressure cycle (with the exception of section V) (cf. FIG. 2).

Table 2 shows, for a two-zone reactor, the letdown processes of the individual sections and the particular valve positions and the switching operations of the hydraulic valves.

For a single-zone reactor charged with 30 t/h of reaction mixture and for a two-zone reactor operated with 20 t/h of reaction mixture, the Examples which follow compare results of the novel process with the letdown processes in the same reactors which are not equipped according to the invention.

In the single-zone reactor described, according to the invention only from 7.8 to 56.25% by weight of the material present in the entire reactor are released into the atmosphere during let-down processes.

For the stated two-zone reactor, the amount of reaction mixture let down into the open during let-down processes is reduced to 4.5–50% by weight according to the invention.

EXAMPLES 1–5

A single-zone reactor was charged with 30 t/h of reaction mixture and operated under 2,300 bar.

During the let-down processes of the individual sections, the following amounts of gas and product were discharged into the high pressure cycle via the discharge line or let down into the open via the separator system.

| Example no. | Trip (event) in section | fed to HP cycle (amount in t) | let down into the open (amount let down) in t | in % |
|---|---|---|---|---|
| 1 | I | 1.4 | 1.8 | 56.25 |
| 2 | II | 2.95 | 0.25 | 7.8 |
| 3 | III | 2.6 | 0.6 | 18.75 |
| 4 | IV | 2.95 | 0.25 | 7.8 |
| 5 | V | 2.9 | 0.3 | 9.4 |

The mass of the reaction mixture present in the entire reactor was 3.2 t. The percentage is based on the total mass. The novel process makes it possible to reduce hydrocarbon emission to 7.8–56.2% by weight.

COMPARATIVE EXAMPLE 1 (for Examples 1–5)

The single-zone reactor with a throughput of 30 t/h of reaction mixture was operated similarly to Examples 1–5, under 2,300 bar. The reactor could not be divided into isolated sections, so that, during the let-down procedure, the material in the entire reactor had to be released into the atmosphere.

EXAMPLES 6–12

A two-zone reactor was charged with 20 t/h of reaction mixture and operated under 2,100 bar. Letdown processes were triggered for each of the individual sections; the following amounts of gas/product were discharged into the high pressure cycle or let down into the open via the separator system.

COMPARATIVE EXAMPLE 2 (for Examples 6–12)

The same two-zone reactor was operated as described in Examples 6–12 with a throughput of 20 t/h of reaction mixture, under 200 bar. The reactor could not be divided into isolated sections. The total material in the reactor had to be released into the atmosphere during a let-down process.

| Example no. | Trip (event) in section | fed to HP cycle (amount in t) | let down into the open (amount let down) in t | in % |
|---|---|---|---|---|
| 6 | I | 1.1 | 1.1 | 50 |
| 7 | II | 2.1 | 0.1 | 4.5 |
| 8 | III | 1.95 | 0.25 | 11.4 |
| 9 | IV | 2.1 | 0.1 | 4.5 |
| 10 | V | 1.9 | 0.3 | 13.6 |
| 11 | VI | 1.95 | 0.25 | 11.4 |
| 12 | VII | 2.1 | 0.1 | 4.5 |

The mass of the reaction mixture present in the entire reactor is 2.2 t. The novel process made it possible to reduce the emission of hydrocarbons to 4.5–50% by weight.

The percentages are based on the total mass.

TABLE 1

Let-down processes in a single-zone reactor
Positions and switching processes of the hydraulic valves

| Trip (event) in section | Hydraulic valves open (remain) | Hydraulic valves closed (remain) | open | close | Comments |
|---|---|---|---|---|---|
| I | $C_1, D_1, E_1, F$ | $B_2, E_2$ 2 to 5 | $C_2, D_2$ 1 | $A, B_1$ | Section I is let down into the atmosphere, the other sections into the HP cycle |
| II | $A, D_1, E_1, F$ | $C_2, E_2$ 1, 3 to 5 | $B_2, D_2$ 2 | $B_1, C_1$ | II is let down into the atmosphere, the remaining sections into the HP cycle |
| III | $A, B_1, E_1, F$ | $D_2, E_2$ 1, 2, 4, 5 | $B_2, C_2$ 3 | $C_1, D_1$ | III is let down into the atmosphere, the other sections into the HP cycle |
| IV | $A, B_1, C_1, F$ | $E_2$ 1–3, 5 | $B_2, C_2, D_2$ 4 | $D_1, E_1$ | IV is let down into the atmosphere, the other sections into the HP cycle |
| V | $A, B_1, C_1, D_1$ | 1–4 | $B_2, C_2, D_2, E_2$, 5 | $E_1, F$ | V is let down into the atmosphere, the other sections into the HP cycle |

TABLE 2

Let-down processes in a two-zone reactor
Positions and switching processes of the hydraulic valves

| Trip (event) in section | Hydraulic valves open (remain) | Hydraulic valves closed (remain) | open | close | Comments | |
|---|---|---|---|---|---|---|
| I | $C_1, D_1, G_1, E_1, F, H_1$ | $B_2, B_4, E_2$ 2 to 7 | $C_2, D_2, G_2, H_2$ 1 | $A_1, A_2, B_1, B_3$ | Only section I | |
| II | $A_1, A_2, D_1, G_1, E_1, F, H_1, B_3$ | $C_2, E_2$ 1, 3 to 7 | $B_2, B_4, D_2, G_2$ 2, $H_2$ | $B_1, C_1$ | Only section II | |
| III | $A_1, A_2, B_1, B_3, G_1, E_1, F$ | $D_2, E_2$ 1, 2, 4 to 7 | $B_2, B_4, C_2, G_2$ 3, $H_2$ | $C_1, D_1, H_1$ | Only section III | Let down |
| IV | $A_1, A_2, B_1, B_3, C_1, D_1, H_1, F$ | $E_2$ 1 to 3, 5 to 7 | $B_2, B_4, C_2, D_2$ 4, $G_2, H_2$ | $G_1, E_1$ | Only section IV | into the |
| V | $A_1, A_2, B_1, B_3, C_1, D_1, G_1, H_1$ | 1 to 4, 6, 7 | $E_2, B_2, B_4, C_2$ 5, $D_2, G_2, H_2$ | $E_1, F$ | Only section V | atmosphere |
| VI | $A_1, A_2, B_1, B_3, C_1, E_1, F, H_1$ | $G_2, E_2$ 1 to 5, 7 | $B_2, B_4, C_2, D_2$ 6, $H_2$ | $D_1, G_1$ | Only section VI | |
| VII | $A_1, A_2, B_1, C_1, D_1, G_1, E_1, F$ | $H_2, E_2$ 1 to 6 | $B_2, B_4, C_2$ 7, $D_2, G_2$ | $B_3, H_1$ | Only section VII | |

We claim:

1. A process for rapidly reducing the pressure in a continuous high pressure polymerization system, in which ethylene or a mixture of ethylene and compounds which are copolymerizable with ethylene is polymerized under from 500 to 5,000 bar and at 150° to 400° C. and the unconverted amounts of gas are let down to 200–400 bar and then recycled through the high pressure recycle gas system into the polymerization system, to below the particular reaction pressure when predetermined limiting pressure and/or temperature values are exceeded or when other faults occur by opening one or more pressure-relief apparatuses mounted on the high pressure polymerization system and transferring the hot let-down reaction mixture from the polymerization system via one or more let-down lines through one or more separator systems into the atmosphere, wherein the high pressure polymerization system is divided into a plurality of isolated sections at the same time as the let-down process is triggered, and only the section in which the let-down process has been triggered is let down to the atmosphere.

2. A process as claimed in claim 1, wherein the sections in which the let-down process has not been triggered are let down into the high pressure recycle gas system in synchronization with triggering of the let-down to the atmosphere.

3. A process as claimed in claim 2, wherein letting down is effected through a product separator into the high pressure recycle gas system.

* * * * *